United States Patent [19]

Arold et al.

[11] Patent Number: 5,209,397
[45] Date of Patent: May 11, 1993

[54] PROCESS FOR THE CLOSED-LOOP AND OPEN-LOOP CONTROL OF AN AIR-CONDITIONING SYSTEM AND AUTOMATIC AIR-CONDITIONING SYSTEM FOR A MOTOR VEHICLES

[75] Inventors: Klaus Arold, Sindelfingen; Erich Kubsch, Weil der Stadt, both of Fed. Rep. of Germany

[73] Assignee: Mercedes-Benz AG, Fed. Rep. of Germany

[21] Appl. No.: 717,667

[22] Filed: Jun. 19, 1991

[30] Foreign Application Priority Data

Jul. 25, 1990 [DE] Fed. Rep. of Germany ....... 4023554

[51] Int. Cl.$^5$ .............................................. F24F 7/00
[52] U.S. Cl. .................... 236/49.3; 165/43; 454/75
[58] Field of Search ................. 454/75, 152; 236/49.3; 165/43

[56] References Cited

U.S. PATENT DOCUMENTS 4,949,779  8/1990  Kenny et al. ..................... 165/43 X

FOREIGN PATENT DOCUMENTS 0015008  1/1982  Japan ................................. 236/49.3

*Primary Examiner*—William E. Wayner
*Attorney, Agent, or Firm*—Evenson, McKeown, Edwards & Lenahan

[57] ABSTRACT

An air-conditioning system for a motor vehicle is controlled in such a manner that the temperature control in the air-conditioning mode occurs with two channels, i.e. corresponding individually to the preset desired values for the left-hand and right-hand side halves of the passenger compartment of the vehicle. This occurs in the automatic air-conditioning mode with a single channel, while the air distribution occurs in both operating modes with a single channel.

1 Claim, 2 Drawing Sheets

AIR DISTRIBUTION IN BOTH SIDE HALVES

PROCESS FOR THE CLOSED-LOOP AND OPEN-LOOP CONTROL OF AN AIR-CONDITIONING SYSTEM AND AUTOMATIC AIR-CONDITIONING SYSTEM FOR A MOTOR VEHICLES

BACKGROUND AND SUMMARY OF THE INVENTION

The invention relates to a process for the closed-loop and open-loop control of an air-conditioning system and automatic air-conditioning system for motor vehicles and, more particularly to a process having a plurality of setting elements for one of a plurality of alternative working programs for the temperature control and/or air distribution. At least one setting element is provided for switching on an automatic mode, having in each case one temperature selection element for manually presetting a desired value of the temperatures to be set in the two side halves of the vehicle passenger compartment and having setting elements for air distribution in the two side halves of the vehicle passenger compartment.

A system of this kind is known from German Patent Document DE 3,427,292 A1. This system has a number of setting elements on its operating unit for primary functions—such as defrosting, cooling, air recirculation—which apply to both side halves of the vehicle passenger compartment and can thus be controlled with one channel. In addition, the operating unit has in each case one temperature selection element for secondary functions for manually presetting a desired value of the temperatures to be set in the two side halves. Setting elements, assigned in each case to the two side halves, are provided for separate working programs—such as automatic operation, maximum opening of the air flaps, closing the ventilation flaps—which can therefore be individually selected for the two side halves and thus controlled with two channels.

Due to the fact that also, at the least, the air distribution for the two side halves occurs separately, twice the number of setting elements are required on the operating unit and also twice the number of actuating elements are required on the air-conditioning box for actuating the flaps on the one hand. On the other hand, this results in a high outlay of material and a large degree of expenditure for actuation and control.

There is therefore needed a system of the generic type which can be optimized with respect to the cost-/utility ratio.

This need is met according to the present invention by a process wherein when the automatic mode is switched on using the setting element, a single-channel temperature control occurs. The desired values manually preset using the temperature selection elements are overridden and the preset desired value for the one side half is made the same as the preset desired value for the other side half and used as a control variable. The automatic mode is switched off using the setting element. A two-channel temperature control occurs in accordance with the manually preset desired values at the temperature selection elements. The air distribution in the two side halves of the vehicle passenger compartment occurs with a single channel using the setting elements common to both side halves.

As a result, without noticeably compromising comfort with respect to the known system, a system is provided in which both a single-channel automatic air-conditioning system and a two-channel air-conditioning system with manual intervention are economically produced.

Other objects, advantages and novel features of the present invention will become apparent from the following detailed description of the invention when considered in conjunction with the accompanying drawings.

DETAILED DESCRIPTION OF THE DRAWINGS

Figure 1:
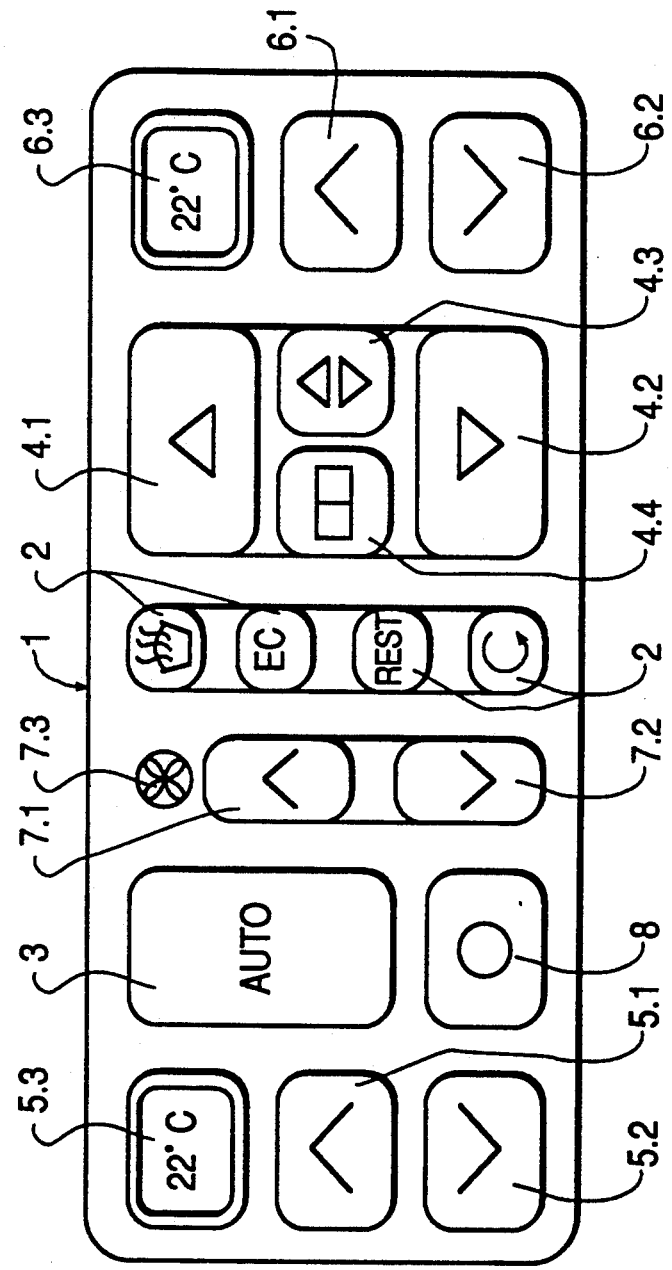
FIG. 1 illustrates an operating unit for the operation of the system according to the process of the invention.

According to FIG. 1, an operating unit 1 is shown for an air-conditioning system and automatic air-conditioning system in motor vehicles. The operating system contains a plurality of setting elements 2, 3 in the form of push switches for one of a plurality of working programs for the temperature control and/or air distribution, i.e., the setting element 3 serves for switching on the automatic air-conditioning mode, setting elements 4.1 to 4.4 in the form of push switches serve for the air distribution in the two side halves of the vehicle passenger compartment, a temperature selection element 5.1, 5.2 in the form of push keys with associated display 5.3 serves for presetting the desired value for the left-hand side half and a corresponding arrangement 6.1 to 6.3 for the right-hand side half, and push keys 7.1, 7.2 serve for setting the speed of a blower (designated symbolically as 7.3).

It is apparent that the temperature level in the two side halves of the vehicle passenger compartment can be set individually by means of: the two temperature selection elements 5.1, 5.2; 6.1, 6.2, a controller 1 (not illustrated) assigned to the two passenger compartment halves for appropriately controlling heat exchangers or components in accordance with the preset values, and the output signal of at least one passenger compartment temperature sensor (not illustrated). Two-channel temperature control thus takes place.

In contrast, the air distribution in the two side halves of the vehicle passenger compartment is performed with the setting elements 4.1 to 4.4 which are common to both side halves. Through setting elements 4.1 to 4.4 the actuating elements of corresponding air flaps for both side halves are actuated. This takes place with a single channel.

The two-channel temperature control and single-channel air distribution above are obtained when the automatic switch 3 is not activated, that is to say the function "air-conditioning system" is selected.

On the other hand, if the "automatic air-conditioning" function is switched on using the automatic switch 3, single-channel air distribution continues but the temperature control now likewise takes place with a single channel. In this manner, the control is oriented towards the preset desired value of one vehicle side—preferably the driver's side—and it makes the preset desired value of the other vehicle side the same as the preset value. This overrides the individual preset desired values so that the following applies: left-hand desired temperature value=right-hand desired temperature value.

Figure 2:
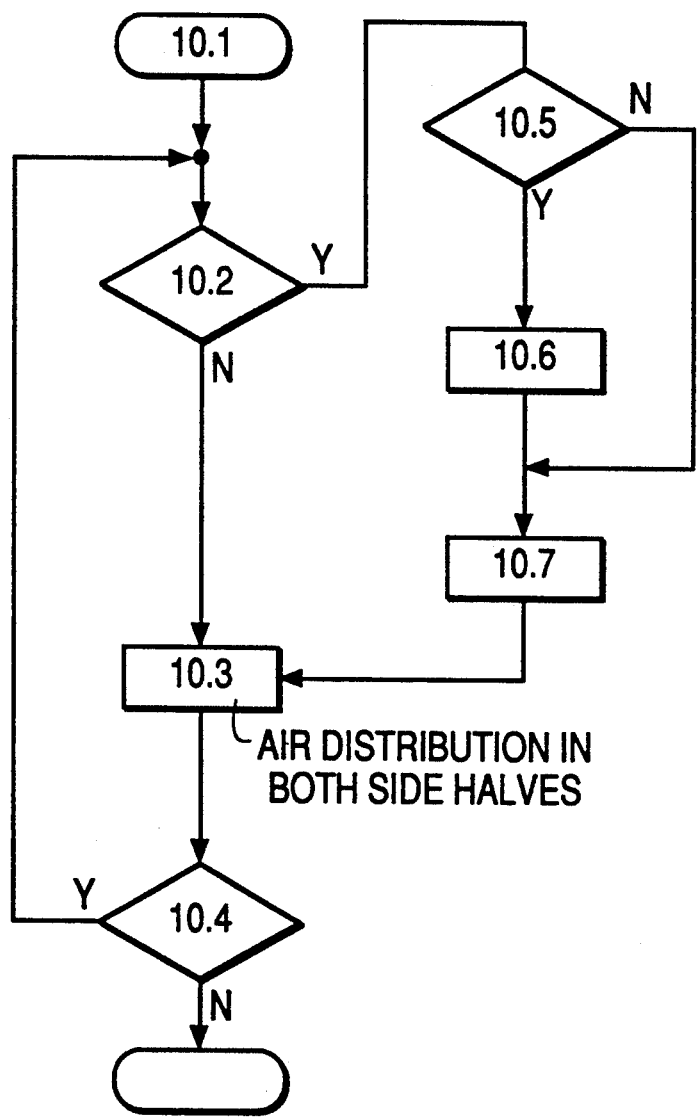
FIG. 2 is a flow diagram of the process according to the present invention.

As is clear from the flow diagram in FIG. 2, the air-conditioning control is started in one step 10.1 when the ON/OFF key 8 on the operating unit I is placed in its ON position or, alternatively, when the ignition is switched on. Then in step 10.2, it is tested whether the automatic air-conditioning mode is switched on by means of the setting element 3, that is to say the automatic switch is in its ON position. If not—that is to say it is in the off position—after step 10.3 the air-conditioning working program operates with individual temperature control for the left-hand and right-hand side halves and identical air distribution in the left-hand and right-hand side halves of the vehicle. In step 10.4, it is tested whether the ON/OFF key 8 is still in its ON position and if not the air-conditioning control is switched off.

However, if the result of the inquiry or test in step 10.2 was that the automatic switch 3 is in its ON position, it can then be tested in step 10.5 whether the individual preset desired values for the temperature are being displayed on displays 5.3 and 6.3, if such displays are present. If they are being displayed in step 10.6, the display 6.3 which is assigned to the front-seat passenger half is switched off and in step 10.7 the preset desired value of the front-seat passenger side is made the same as the preset desired value of the driver's side. In step 10.3, the automatic air-conditioning working program with single-channel temperature control and also single-temperature control and air distribution for the left-hand and right-hand side halves, then operates.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A process for closed-loop and open-loop control of an air-conditioning system and an automatic air-conditioning system having an operating unit for a vehicle passenger compartment having two side halves in a motor vehicle including a plurality of setting elements for setting one of a plurality of alternative working programs for at least one of temperature control and air distribution, at least one of said setting elements being provided for switching on an automatic mode for the automatic air-conditioning system; one temperature selection element for manually presetting a desired value of the temperatures to be set in each of the two side halves; and air distribution setting elements for air distribution in the two side halves of the vehicle passenger compartment, the process comprising the steps of:

operating a single channel temperature control when said automatic mode is switched on using said at least one setting element by:
overriding said desired value of temperatures manually preset using said one temperature selection element; setting said desired value manually preset for one side half equal to said desired value manually preset for the other side half; using said desired value manually preset for one side half as a control variable;

operating a two-channel temperature control when said automatic mode is switched off using said at least one setting element in accordance with said manually preset desired values at the temperature selection elements; and using the setting elements common to both of said two side halves to provide air distribution in the two side halves of the vehicle passenger compartment with a single channel.

* * * * *